Figure 1:
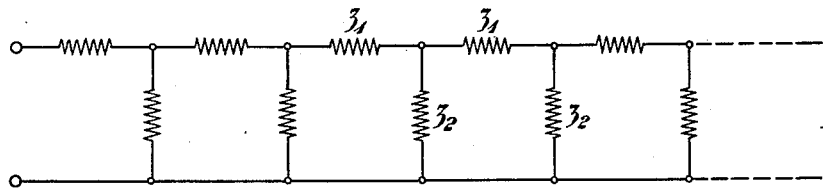

July 26, 1927.

G. C. REIER 1,636,713

ELECTRICAL WAVE FILTER

Filed Sept. 8, 1921

3 Sheets-Sheet 1

INVENTOR
*G. C. Reier*
BY
*G. E. Folk*
ATTORNEY

July 26, 1927.

G. C. REIER 1,636,713

ELECTRICAL WAVE FILTER

Filed Sept. 8, 1921   3 Sheets-Sheet 2

INVENTOR
G. C. Reier
BY
ATTORNEY

July 26, 1927.
G. C. REIER
1,636,713
ELECTRICAL WAVE FILTER
Filed Sept. 8, 1921
3 Sheets-Sheet 3
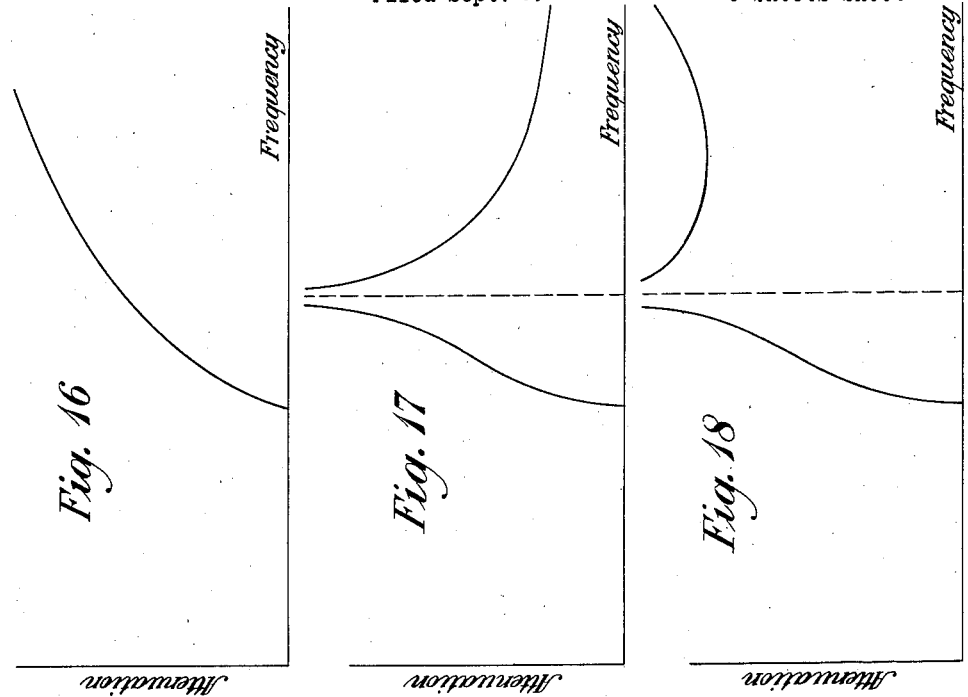
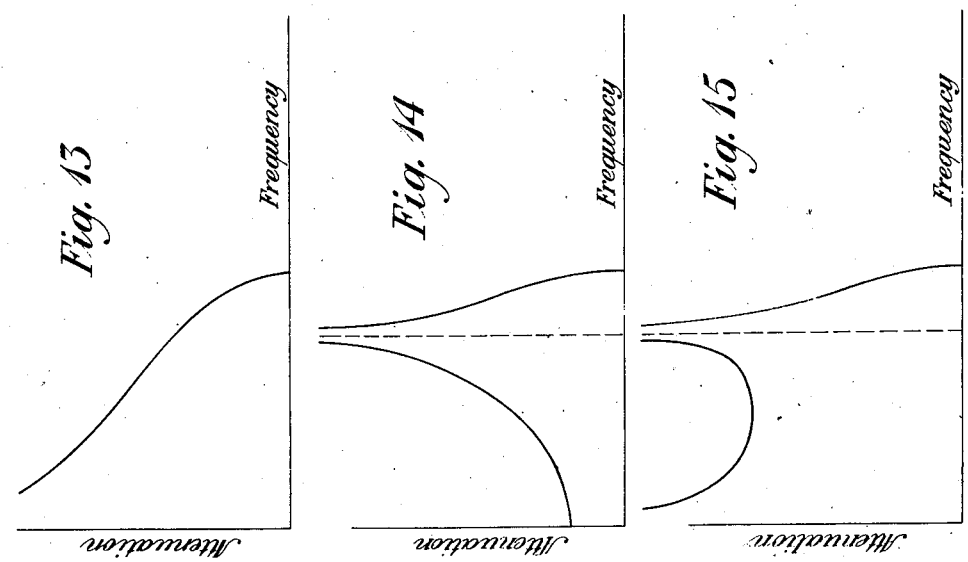
INVENTOR
*G. C. Reier*
BY
ATTORNEY Patented July 26, 1927.

1,636,713

UNITED STATES PATENT OFFICE.

GEORGE C. REIER, OF BROOKLYN, NEW YORK, ASSIGNOR TO AMERICAN TELEPHONE AND TELEGRAPH COMPANY, A CORPORATION OF NEW YORK.

ELECTRICAL WAVE FILTER.

Application filed September 8, 1921. Serial No. 499,190.

The principal object of my invention is to provide a new and improved wave filter having certain desirable operating characteristics. Another object of my invention is to provide a modification of a simple high-pass or low-pass wave filter that shall sharpen the cut-off between the free transmitting and attenuating ranges. Other objects of my invention will become apparent on consideration of the following specification in which I have specifically disclosed two embodiments with the understanding that the scope of the invention is defined in the appended claims.

I now proceed to a specific description of the examples of my invention which I have chosen to illustrate in the drawings.

Figure 2:
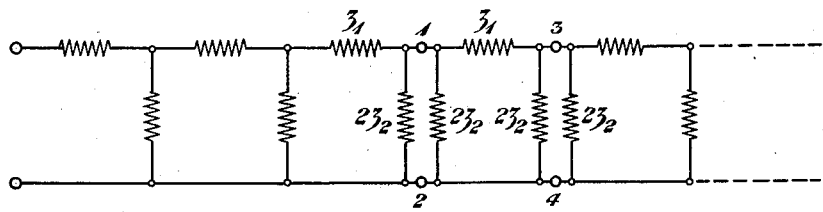
Figure 3:
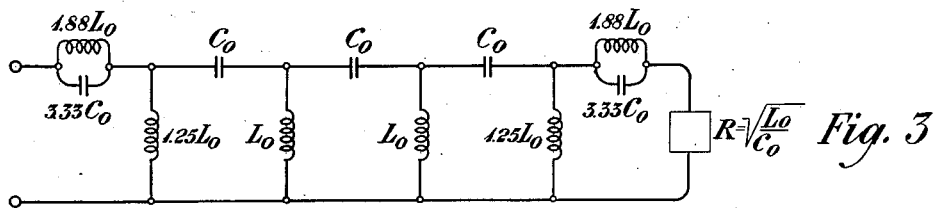
Figure 4:
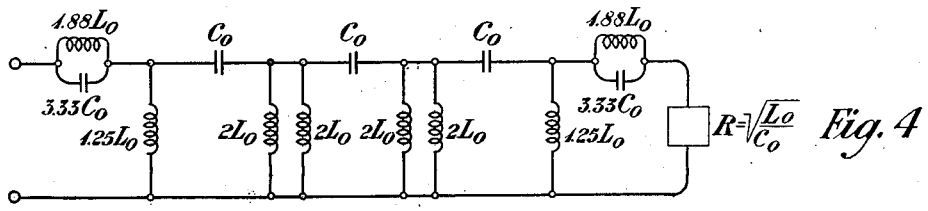
Figure 5:
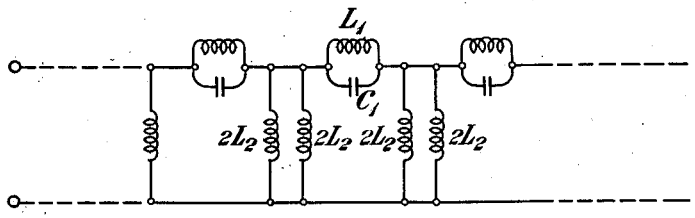
Figure 6:
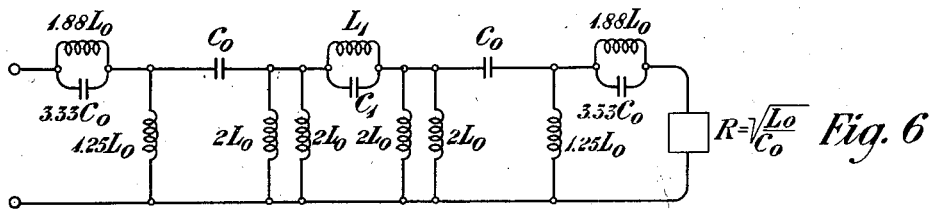
Figure 7:
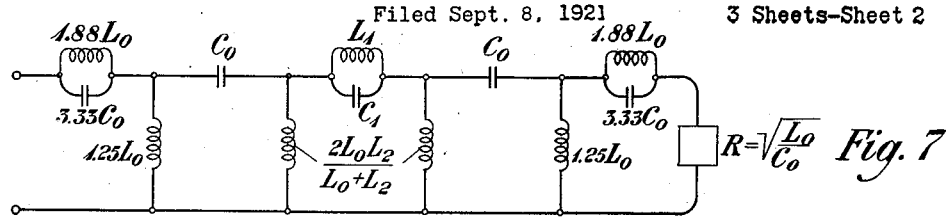
Figure 8:
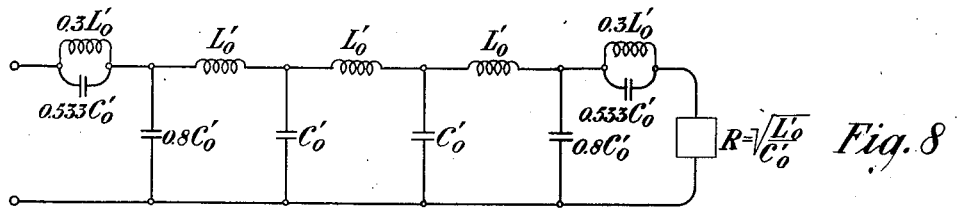
Figure 9:
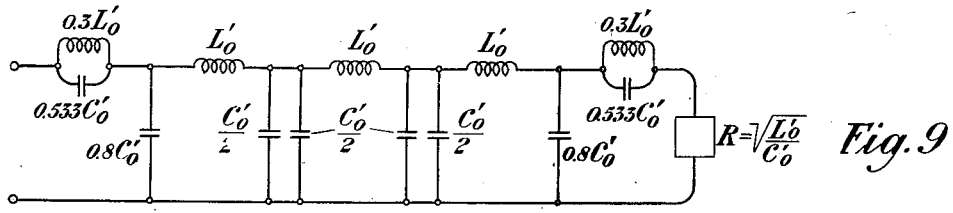
Figure 10:
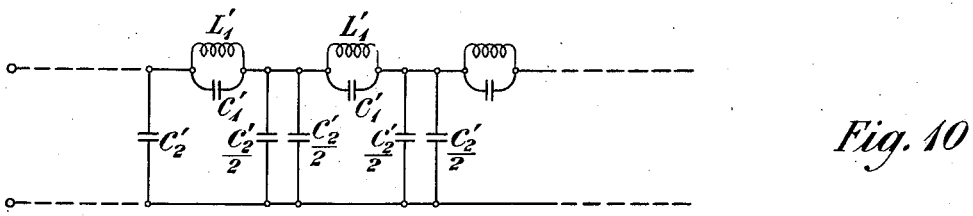
Figure 11:
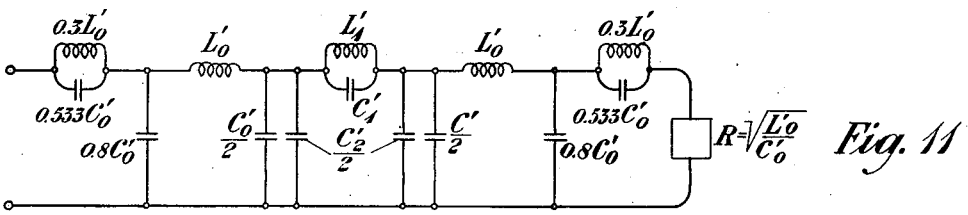
Figure 12:
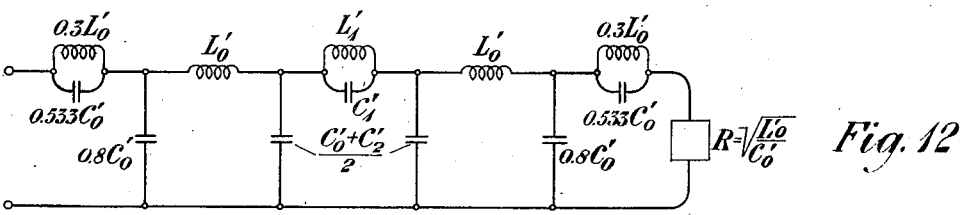

Figure 1 is a diagram showing a wave filter of general type; Fig. 2 is a diagram corresponding to Fig. 1 and having certain modifications to facilitate explanation; Fig. 3 is a diagram of a simple high-pass wave filter having appropriate terminal networks; Fig. 4 is a detailed modification of Fig 3 to facilitate explanation; Fig. 5 is a diagram of a high-pass wave filter of a different type from that shown in Fig. 3; Fig. 6 is a diagram showing a modified high-pass wave filter embodying my invention; Fig. 7 is a diagram corresponding to Fig. 6 but with certain impedance elements consolidated; Fig. 8 is a diagram of a simple low-pass wave filter with appropriate terminal networks; Fig. 9 shows a modification of detail in Fig. 8 to facilitate explanation; Fig. 10 is a diagram of another type of low-pass wave filter from that shown in Fig. 8; Fig. 11 shows a modified low-pass wave filter embodying the improvement of my invention; Fig. 12 shows the same with certain impedance elements consolidated; and Figs. 13, 14, 15, 16, 17 and 18 are attenuation-frequency characteristics for the filters of Figs. 3, 5, 7, 8, 10 and 12 respectively.

In presenting the theory of wave filters, it is customary first to consider a network like that shown in Fig. 1 with series impedances $z_1$ and shunt impedances $z_2$ repeated indefinitely, or, in other words, extending to infinity. It is assumed that these impedances $z_1$ and $z_2$ are pure reactances, for the reason that the dissipation losses are so small they may be neglected with approximate accuracy for many purposes. Since an impedance element such as $z_2$ is equivalent to two impedances, each $2z_2$ in parallel, it will be evident that Fig. 2 can be substituted for Fig. 1. Since the structure extends to infinity, the impedance across the points 1 and 2, looking to the right, will be the same as across the points 3 and 4, looking to the right. This is the mid-shunt iterative impedance and will be designated $Z_{msh}$. Accordingly, we have the admittance equation $$\frac{1}{Z_{msh}} = \frac{1}{2z_2} + \frac{1}{z_1 + \frac{2z_2 \cdot Z_{msh}}{2z_2 + Z_{msh}}}$$

The solution of this equation is $$Z_{msh} = \frac{z_1 z_2}{\sqrt{z_1 z_2 + \tfrac{1}{4} z_1^2}} \quad (1)$$

Fig. 3 shows a known high-pass wave filter of simple type having appropriate terminal networks. This is a finite structure, and the terminal networks may be looked upon as taking the place of the infinite extension of the filter shown in Fig. 1. It will be seen that the series impedances are given by the reactance of the condensers $C_0$, and the shunt impedances are given by the reactances of the inductance coils $L_0$. Evidently the modification shown in Fig. 4 is equivalent to Fig. 3, having each inductance $L_0$ substituted by two inductances in parallel each $2L_0$.

The critical or cut-off frequencies of a filter are known to be given by the equations $$\frac{z_1}{z_2} = -4 \quad (2)$$

and $$\frac{z_1}{z_2} = 0 \quad (3)$$

In the high-pass filter, the upper critical frequency is at infinity and corresponds to equation 3. Accordingly, equation 2 gives the critical or cut-off frequency for the high-pass filter of Fig. 3, which is $$f_h = \frac{1}{4\pi \sqrt{C_0 L_0}} \quad (4)$$

For the filter of Fig. 3, it is readily shown from equation 1 that $$Z_{msh} = \frac{4\pi f L_0}{\sqrt{L_0 C_0 (4\pi f)^2 - 1}} \quad (5)$$

which expresses $Z_{msh}$ as a function of the variable frequency $f$. Equations 4 and 5 may be looked upon as the design equations for the simple high-pass filter of Fig. 3; having given the desired mid-shunt characteristic impedance at a particular frequency $f$, and the desired critical frequency $f_h$, these equations determine $L_0$ and $C_0$ and thus fully determine the filter shown in Fig. 3.

The attenuation characteristic of the filter of Fig. 3 is shown in Fig. 13, which may be looked upon as a graph of the relation between $\alpha$ and $f$ in the equation $$\cosh(\alpha + i\beta) = 1 + \frac{1}{2} \cdot \frac{z_1}{z_2} \quad (6)$$

where $z_1$ and $z_2$ are functions of frequency $f$ and $\alpha + i\beta$ is the propagation constant.

I will now show how the characteristic shown in Fig. 13 can be made steeper, in other words, how the cut-off can be made sharper in the filter.

Consider the high-pass filter shown in Fig. 5. From physical considerations it is at once apparent that it will have an infinite attenuation at the resonance frequency $f'$ for each series loop $L_1C_1$. Hence $$f' = \frac{1}{2\pi\sqrt{L_1 C_1}} \quad (7)$$

Expressing the critical or cut-off frequency for the filter of Fig. 5 by means of equation 2 and making $f_h$ the same as for Fig. 3 and equation 4, we get the condition $$L_1 = 4L_2(4\pi^2 f_h^2 L_1 C_1 - 1) \quad (8)$$

Making the mid-shunt characteristic impedances the same for Figs. 5 and 3 by means of equations 1 and 5, we get another condition, viz., $$L_0 C_1 = L_2 C_0 \quad (9)$$

which is independent of frequency and involves the circumstance that the impedances are equal for any particular frequency over the whole frequency range.

The three equations 7, 8 and 9 serve to determine the three quantities $L_1$, $C_1$ and $L_2$ in terms of $f_h$ and $f'$, and enable us to make the filters of Figs. 5 and 3 alike with respect to their cut-off frequency and their mid-shunt characteristic impedance, leaving us free to determine the parameter $f'$ as we please. Accordingly, we set this at a value a little less than $f_h$ and get an attenuation characteristic for Fig. 5 such as shown in Fig. 14.

Fig. 6 is like Fig. 3 except that I have replaced one section of Fig. 3 between mid-shunt points by a section of Fig. 5. Thus I combine the advantages of the characteristics in Figs. 13 and 14 and get the characteristic shown in Fig. 15 for the filter of Fig. 6. This modification of Fig. 3 evidently involves no change in the critical frequency of the filter, and it introduces no reflection effects, because the mid-shunt characteristic impedance is the same at all mid-shunt points of the composite filter of Fig. 6.

A corresponding improvement can be made in the low-pass filter shown in Fig. 8. Evidently each of the shunt condensers $C_0'$ can be replaced as in Fig. 9 with like impedance effect by two condensers in parallel, each of capacity $$\frac{1}{2}C_0'.$$

Formula 1 can now be applied to compute the mid-shunt characteristic impedance, and formula 2 to compute the critical frequency. In this case the frequency corresponding to equation 3 is at zero.

Considering the low-pass filter shown in Fig. 10. From physical consideration it is seen that it has infinite attenuation at the resonance frequency for each series loop comprising the elements $C_1'$ and $L_1'$. Call this frequency of infinite attenuation $f''$, and we have the equation $$f'' = \frac{1}{2\pi\sqrt{L_1' C_1'}} \quad (10)$$

By means of equations 1 and 2, two other conditions can be imposed on $L_1'$ and $C_1'$ and $C_2'$ by making the mid-shunt characteristic impedance the same, and making the critical frequency $f_1$ the same, as for the simple low-pass filter of Fig. 8. This leaves us free to assign any value we please to $f''$, and we make it a little higher than the critical frequency $f_1$. Fig. 16 shows the attenuation characteristic for the filter of Fig. 8, and Fig. 17 for the filter of Fig. 10. These characteristics are determined as graphs of the relation of $\alpha$ and $f$ in equation 6. For the composite filter of Figs. 11 and 12, the attenuation characteristic is shown in Fig. 18. This composite filter has the same cut-off frequency as the simple filter of Fig. 9, the same mid-shunt characteristic impedance, and no reflection effects are introduced by the composite structure. Fig. 18 compared with Fig. 16 shows how it gives a sharper cut-off between the free transmitting and attenuating ranges.

By my invention, it becomes possible to improve the attenuation characteristic of a high-pass or low-pass filter by a simple modification of structure so as to sharpen the cut-off without altering the filter from an impedance standpoint.

I claim:

1. A wave filter of the type having recurrent sections, said sections being of at least two different kinds such that a wave filter made up entirely of one kind of these sections will have a different attenuation frequency characteristic as compared with a wave filter made up entirely of another kind of the sections, but will have its critical frequencies the same and its impedance frequency characteristic the same as a wave filter made up entirely of the other kind of the sections.

2. A wave filter having a cut-off sharpened by the replacement of a section thereof by a section of different type, said section of different type being such that a filter with all its sections of that type will have infinite attenuation at a frequency near the frequency of said cut-off, whereby the attenuation characteristic of the resultant filter as a whole is made steeper near its critical frequency.

3. A wave filter having sections of different attenuation frequency characteristics but the same cut-off frequency, one section giving high attenuation over one frequency range and another section over another frequency range, whereby the composite filter gives high attenuation over both ranges, all such sections attenuating on the same side of said cut-off frequency and transmitting freely on the other side.

4. A wave filter of the type having recurrent sections, having its cut-off sharpened by the introduction of a section having a loop as series impedance element, said loop being anti-resonant at a frequency near the cut-off frequency in the attenuating range.

5. A wave filter having a single finite critical frequency and comprising two types of sections, one type of section being such that a filter having all its sections of that type gives high attenuation at a frequency remote from the critical frequency, and another type of section being such that a filter with all its sections of that type will give high attenuation at a point near the critical frequency on the same side thereof.

6. A wave filter having series elements and shunt elements, one kind of elements being condensers and the other being inductances, and also having an interposed anti-resonant loop as a series element.

In testimony whereof, I have signed my name to this specification this 1st day of September 1921.

GEORGE C. REIER.